United States Patent [19]

Lenzen

[11] Patent Number: 5,145,209
[45] Date of Patent: Sep. 8, 1992

[54] SEAT BELT PRETENSIONER

[75] Inventor: Reiner Lenzen, Almont, Mich.

[73] Assignee: TRW Vehicle Safety Systems Inc., Lyndhurst, Ohio

[21] Appl. No.: 693,060

[22] Filed: Apr. 30, 1991

Related U.S. Application Data

[63] Continuation of Ser. No. 479,394, Feb. 13, 1990, abandoned.

[51] Int. Cl.$^5$ .............................................. B60R 22/46
[52] U.S. Cl. ..................................... 280/806; 60/632; 242/107; 297/480
[58] Field of Search ............... 280/806, 734, 735; 60/635, 636, 632, 638; 242/107; 297/480, 470; 102/275.6, 275.5, 275.1

[56] References Cited

U.S. PATENT DOCUMENTS

| | | | |
|---|---|---|---|
| 3,590,739 | 7/1971 | Persson | 102/275.5 |
| 4,178,016 | 12/1979 | Andres et al. | 280/734 |
| 4,220,087 | 9/1980 | Posson | 102/275.6 |
| 4,508,287 | 4/1985 | Nilsson | 242/107 |
| 4,549,704 | 10/1985 | Föhl | 242/107 |
| 4,573,322 | 3/1986 | Föhl | 60/638 |
| 4,699,400 | 10/1987 | Adams et al. | 107/275.5 |
| 4,706,990 | 11/1987 | Stevens | 280/734 |
| 4,750,685 | 6/1988 | Frei | 242/107 |
| 4,750,686 | 6/1988 | Föhl | 242/107 |
| 4,789,185 | 12/1988 | Föhl | 280/806 |

Primary Examiner—Charles A. Marmor
Assistant Examiner—Karin Tyson
Attorney, Agent, or Firm—Tarolli, Sundheim & Covell

[57] ABSTRACT

A seat belt pretensioner according to the present invention comprises a piston movable by high pressure gas. A flexible cable, responsive to movement of the piston, rotates the take-up spool in a belt retraction direction to pull the belt against the vehicle occupant and eliminate slack in the belt. A linear ignition material for generating a high pressure gas is in fluid communication with the piston to move the piston in response to ignition of said linear ignition material. The linear ignition material comprises a frangible sheath and at least one gas generating pyrotechnic cord disposed within said sheath.

13 Claims, 3 Drawing Sheets

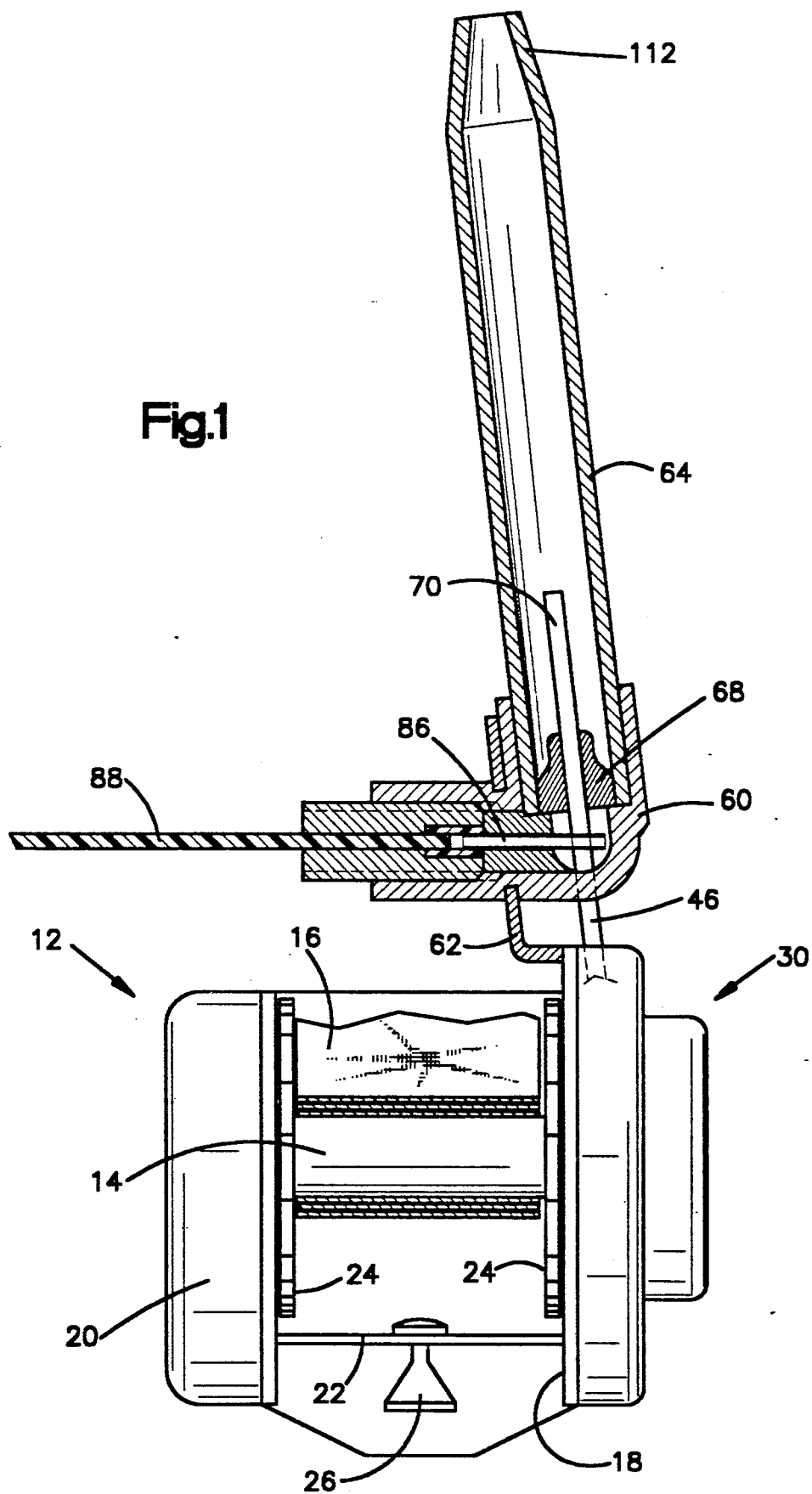

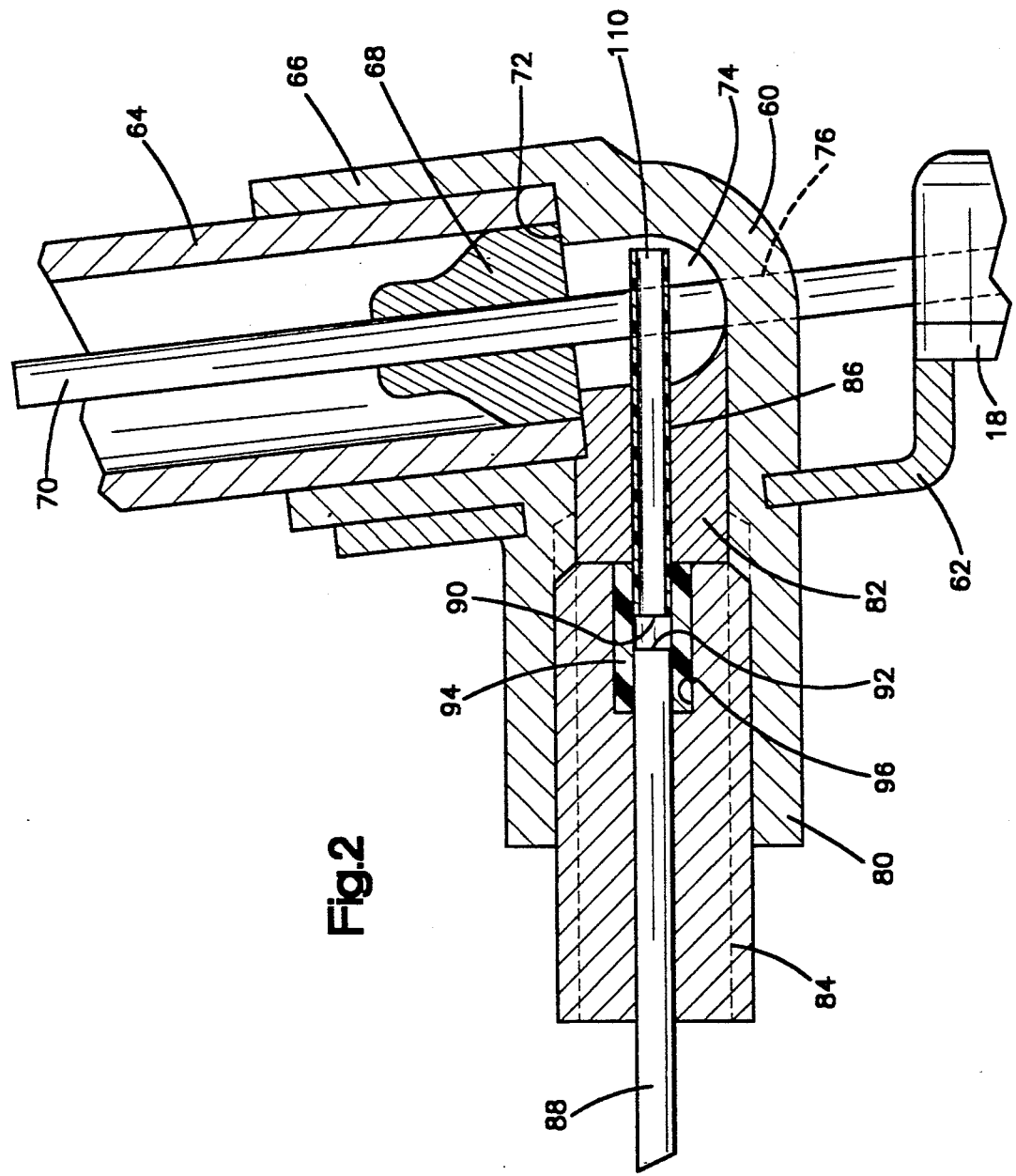

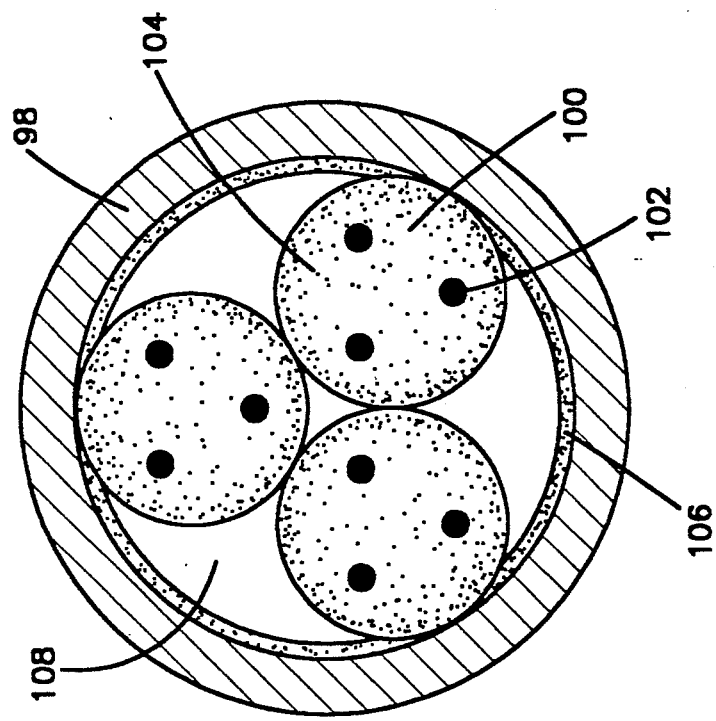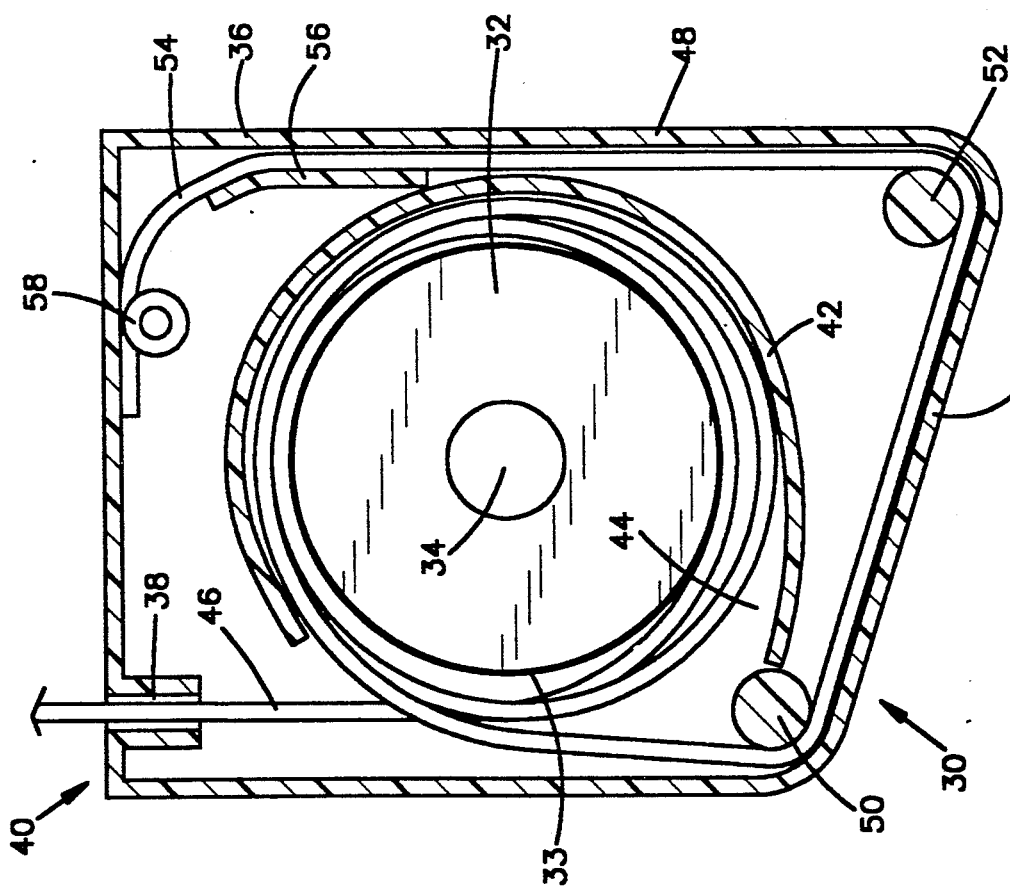

SEAT BELT PRETENSIONER

This is a continuation of copending application Ser. No. 07/479,394 filed on Feb. 13, 1990, now abandoned.

BACKGROUND OF THE INVENTION

1. Field of the Invention

The present invention relates to a vehicle occupant restraint and, in particular, to a pretensioner for taking up slack in a seat belt in the event of a vehicle collision.

2. Description of the Prior Art

U.S Pat. No. 4,178,016 discloses a vehicle seat belt pretensioner which is activated by ignition of a pyrotechnical charge. The pyrotechnical charge is ignited by a fuse which is connected to the pyrotechnical charge.

U.S. Pat. No. 4,549,704 also discloses a seat belt pretensioner. The seat belt is wound on the spool of a seat belt retractor. The pretensioner comprises a tension roll which is mounted on an axial extension of the shaft for the retractor spool. A cable is looped around the tension roll several times. The tension roll can rotate within the cable wraps without frictionally engaging the cable during normal withdrawal and retraction of the seat belt. A free end of the cable is attached to a drive device. The drive device is movable in a direction away from the tension roll. When moved, a loop of the cable is contracted onto the tension roll. Further movement of the drive device rotates the tension roll, in turn, rotating the seat belt spool in a belt retraction direction. The number of loops of the cable on the tension roll is sufficient to pull the seat belt against the occupant and eliminate any slack in the seat belt webbing.

U.S. Pat. No. 4,789,185 discloses a gas generator for actuating a drive device for a seat belt pretensioner. The gas generator comprises a housing containing a propellant charge. A piston is connected to a free end of a pretensioner take-up device such as that disclosed in U.S. Pat. No. 4,549,704. On ignition, the propellant charge generates a high pressure gas which acts against the piston causing the pretensioner to rotate a seat belt spool in a belt retraction direction.

Other patents which disclose seat belt pretensioning devices are U.S. Pat. No. 4,750,686; U.S. Pat. No. 4,573,322; and U.S. Pat. No. 4,750,685.

U.S. Pat. No. 4,706,990 discloses a detonation train for actuation of a gas generator for a vehicle occupant airbag restraint. The detonation train comprises a fuse which is capable of transferring an initiation stimulus received from an impact sensor. The fuse can be a mild detonating fuse (MDF) or a thin layer explosive line (TLX). The fuse contains a pyrotechnic material and has a high rate of propagation, e.g., 6,000-21,000 feet per minute. The fuse ignites an ignition material. The patent discloses, as suitable ignition materials, HAVE-LITE (trademark, McCormick Selph Associates) and ITLX (trademark, Explosive Technologies, Inc.).

SUMMARY OF THE INVENTION

A seat belt pretensioner according to the present invention comprises means defining a drive member movable by high pressure gas. Means responsive to movement of the drive member rotates the take-up spool of a seat belt retractor upon movement of the drive member. Movement of the drive member thus rotates the take-up spool in a belt retraction direction to pull the belt against the vehicle occupant and eliminate slack in the belt. A linear ignition material for generating a high pressure gas is in fluid communication with the drive member. The linear ignition material, when ignited, creates gas which causes movement of the drive member. The linear ignition material comprises a frangible sheath and at least one gas generating pyrotechnic cord disposed within the sheath.

In a preferred embodiment, the means for rotating the take-up spool comprises a reel mounted on an axial extension of the seat belt retractor spool. A flexible connector has one end connected to the drive member. The flexible connector is looped loosely around the reel. Movement of the drive member tightens a loop of the flexible connector on the reel. Further movement of the drive member rotates the reel in a belt retraction direction.

Preferably, the pretensioner comprises an elongated fuse having one end coupled adjacent to an end of the linear ignition material to ignite the linear ignition material. The fuse comprises an elongated tube and means for propagating a detonating shock wave along the tube.

BRIEF DESCRIPTION OF THE DRAWINGS

Further features of the present invention will become apparent to those skilled in the art to which the present invention relates from reading the following specification with reference to the accompanying drawings, in which:

FIG. 1 is a partial sectional elevation view of a seat belt retractor and pretensioner in accordance with the present invention;

FIG. 2 is an enlarged sectional view of a portion of the pretensioner of FIG. 1;

FIG. 3 is a sectional, side view of the pretensioner of FIG. 1; and

FIG. 4 is a sectional view of a linear ignition material in accordance with the present invention.

DESCRIPTION OF PREFERRED EMBODIMENT

A seat belt retractor 12 for use in an automotive vehicle is illustrated in FIG. 1. The seat belt retractor 12 includes a spool 14 having a longitudinal central axis. Seat belt webbing 16 is wrapped around the spool 14. The spool is supported for rotation within a seat belt retractor housing 18 for rotation in a belt retraction direction or belt withdrawal direction about the longitudinal axis of the spool 14. A wind-up spring (not shown) contained within a housing cover 20 biases the spool 14 to rotate in a belt retraction direction, in a known manner.

A locking pawl 22 is supported by the frame 18 for pivotal movement. Locking ratchet wheels 24 are mounted on the spool 14. An inertial member 26 pivots during an emergency situation, such as a collision, to move the locking pawl 22 into engagement with the ratchet wheels 24. This blocks the spool 14 against rotation in a belt withdrawal direction.

A belt pretensioner 30 is mounted on the housing 18. The belt pretensioner 30, in the event of an emergency situation, such as a collision, rotates the belt spool 14 in a belt retraction direction to pull the belt webbing forcibly against the vehicle occupant.

The pretensioner 30 comprises a cylindrical tension roll 32 (see FIG. 3) having an outer cylindrical friction surface 33, such as a rubberized surface. The tension roll 32 is mounted on an axial extension 34 of the seat belt retractor spool 14 (FIG. 1). The tension roll 32 is contained within a pretensioner housing 36. At one corner 40, the housing 36 has an opening 38. The housing 36 also has an inner curved member 42 which is spaced from the cylindrical outer surface 33 of the tension roll 32 and extends partially around the tension roll. The curved member 42 defines with the tension roll 32 an arcuate channel 44 around the tension roll.

A flexible connector, in the form of a wire cable 46, extends through the opening 38. The cable 46 initially extends tangentially of the tension roll 32, and then makes several loops around the tension roll. The loops are confined, in part, in the channel 44 by the curved member 42. After looping around the tension roll 32, the cable 46 extends tangentially from the tension roll and is guided around the inner surface of the wall 48 of the housing 36 by posts 50 and 52. Posts 50 and 52 are located adjacent two different corners of the housing 36. The cable is releasably secured, at its end 54, to the wall 48 of the housing 36 by a guide plate 56 and a pin 58.

To assemble the components of the pretensioner 30, the cable 46 is introduced into opening 38 and wrapped, several times, around the tension roll 32. By way of example, the cable 46 may make three wraps or loops around the tension roll. The cable 46 is then guided around the posts 50, 52 and the guide plate 56 and is secured, at end 54, by pin 58. In assembly of the pretensioner components of FIG. 3, care is taken to make sure that the loops of the cable 46 are loosely wrapped around the tension roll 32. Thus, the tension roll 32 can rotate freely upon retraction and withdrawal of the seat belt 16 (FIG. 1), without interference from the cable 46.

Referring to FIG. 2, the pretensioner 30 also comprises an L-shaped hollow casting 60. The casting 60 is secured to the pretensioner housing 36 by flange 62. An elongated sleeve 64 is seated in and extends axially from an open end 66 (see FIG. 2) of one leg of the L-shaped casting 60. A piston 68 is movable longitudinally within the sleeve 64. The piston 68 (FIG. 2) is seated against an annular, radially extending inner surface 72 of the casting end 66 and partially defines, with the casting 60, a pressure chamber 74. The piston 68 is secured to an end 70 of cable 46 opposite the end 54 (FIG. 3). The cable 46 enters the casting 60 through an opening 76, extends through the pressure chamber 74, and is fixed to the piston 68.

The free end 80 of the other leg of the L-shaped casting contains an inner plug 82 and an outer plug 84. The inner plug 82 partially defines the pressure chamber 74 and supports a piece of linear ignition material 86 which extends into the pressure chamber. The outer plug 84 is inserted into the casting end 80 after the inner plug 82 and supports a length of elongated fuse 88. The adjacent ends 90 and 92 of the linear ignition material and fuse, respectively, are coupled and held together by means of a piece of tubing 94 which is seated in a counterbore 96 in one end of the outer plug 84.

Referring to FIG. 4, the linear ignition material 86 comprises a frangible sheath 98 which is made of a material such as polypropylene or low density polyethylene. One or more ignitable cords 100 are disposed within the sheath 98. Each cord 100 comprises one or more strands 102, such as fiberglass strands, metal strands, or polymeric strands. The strands 102 are coated with a powdered ignitive material 104 which comprises a metal fuel having a high heat of combustion, an oxidant, and a binder. Examples of suitable fuels are aluminum, titanium, magnesium, a 50/50 magnesium/aluminum alloy, amorphous boron, a 70/30 zirconium/nickel alloy, and calcium silicate. Examples of suitable oxidants are potassium perchlorate, ammonium perchlorate, nitrates, chromates, polychromates, and perchlorates of alkali or alkaline earth metals, ammonia or organic bases. The sheath 98 can also have a coating 106 on the inside of the sheath which can be the same material as the ignitive powdered material 104 of cords 100. An elongated gas channel 108 extends longitudinally within the sheath to support ignition of the ignitive materials 104, 106.

When cords 100 are ignited, the ignitive reaction travels along the material 104, 106. Since the sheath 98 is frangible, it shatters due to the ignitive reaction, allowing gas to escape into pressure chamber 74. Gas also escapes into pressure chamber 74 through an open end 110 of the linear ignition material 86 (FIG. 2). The rate of propagation of the ignition of the linear ignition material 86 is about 800 to about 1,500 feet per minute. Further details concerning the linear ignition material are contained in U.S. Pat. No. 4,220,087. The linear ignition material is marketed by Explosive Technologies, Inc. under the trademark ITLX. In the embodiment of FIG. 2, the linear ignition material 86 has a length of preferably about 110 millimeters. However, the length could be 50 to 250 millimeters. An advantage of the linear ignition material 86 having a frangible sheath is that it provides a very rapid generation of gas pressure for movement of piston 68 in the event of a vehicle collision.

In the embodiment illustrated in FIG. 3, the fuse 88 is a thin layer explosive line known as TLX. Details of TLX are disclosed in U.S. Pat. No. 3,590,739. The fuse 88 comprises an elongated hollow tube having a coating of pyrotechnic material on the inner surface of the tube. When ignited, the pyrotechnic material propagates a gaseous percussion wave along the tube. The tube is made of a high temperature plastic material which expands radially adjacent to the percussion wave without rupture and which can withstand high temperatures. Suitable such materials are KYNAR, and HALAR (trademarks, E. I. Dupont de Nemours & Co.). The rate of propagation of TLX is in the range of about 5,000 to about 6,000 feet per second.

Another suitable fuse material is NONEL (trademark, Nitro Nobel AB). NONEL is similar to TLX except that NONEL has an inner tube made of SURLYN (trademark E. I. DuPont de Nemours & Co.). NONEL has an outer tube made of polyvinyl chloride or linear low density polyethylene. The velocity of the ignition of NONEL is about 6,000 feet per second.

Still another suitable fuse material is BLASTMASTER (trademark, Atlas Powder Co.). This product includes a small diameter tube with a filament disposed within the tube. The filament is preferably made of an inert strand coated with ammonium perchlorate and aluminum powder. The velocity of ignition of BLASTMASTER is about 5,000 ft./sec.

The tube 94 which holds the opposite ends 90 and 92 of the fuse 88 and linear ignition material 86 together can be any rigid material having sufficient strength to hold the ends of the fuse 88 and linear ignition material 86 in alignment. Examples are a polymeric material or a metallic tube. One suitable polymeric material is TYGON (trademark, Norton Company), a vinyl compound. Preferably, the fuse 88 and linear ignition material 86 are fastened within the coupling tube 94 by means of a suitable adhesive.

In operation, in the event of a vehicle collision, a signal from a suitable sensor (not shown) ignites the fuse 88 (FIG. 2). The fuse 88, in turn, ignites the linear ignition material 86. Ignition of the linear ignition material creates high pressure in the pressure chamber 74 of casting 60, causing the piston 68 to move toward end 112 of the sleeve 64 and to withdraw wire rope 46 from the pretensioner housing 36. The withdrawal of the wire rope 46 causes a loop of the rope to tighten onto the friction surface 33 of the tension roll 32 and thereby engage the tension roll. Further movement of the piston 68 in the casting sleeve 64 (FIG. 2) causes the tension roll 32 to rotate in a belt retraction direction. This forcibly pulls the seat belt against the vehicle occupant.

The ratchet wheels 24 (FIG. 1) for the seat belt retractor 12 are engaged, in the event of an accident, by the retractor pawl 22, which is activated by inertia member 26. However, the ratchet teeth of the wheels 24 are configured to allow the belt spool to rotate in a belt retraction direction, even though the pawl blocks rotation in a belt withdrawal direction. Thus, the belt becomes tightened against the vehicle occupant and then is held in a tightened condition by engagement of the pawl 22 with the ratchet wheels 24.

It should be understood that although the present invention has been described with respect to one mechanism for engaging the pretensioner with the seat belt spool of a seat belt retractor, other types of mechanisms can be used. Examples are disclosed in prior U.S. Pat. Nos. 4,750,685 and 4,750,686.

From the above description of a preferred embodiment of the invention, those skilled in the art will perceive improvements, changes and modifications in the invention. Such improvements, changes and modifications within the skill of the art are intended to be covered by the appended claims.

Having described a preferred embodiment of the invention, the following is claimed:

1. A pretensioner for a vehicle seat belt retractor having a rotatable take-up spool on which seat belt webbing is wound, said pretensioner comprising:
    a pressure chamber;
    a drive member movable in said chamber by a high pressure gas;
    means responsive to movement of said drive member for rotating said take-up spool in a belt retraction direction to pull the seat belt webbing against a vehicle occupant and eliminate slack in the seat belt webbing;
    a gas generating means for generating at least a substantial portion of said high pressure gas consisting of an elongated frangible sheath and pyrotechnic material disposed within said sheath, said pyrotechnic material comprising at least one elongated gas generating pyrotechnic cord disposed within said sheath;
    means for igniting said pyrotechnic cord;
    means for holding said frangible sheath so that a high pressure gas is released from said frangible sheath on ignition of the pyrotechnic cord; and
    means whereby said high pressure gas is released into said pressure chamber.

2. The pretensioner of claim 1 wherein said means for rotating said take-up spool comprises a reel mounted on an axial extension of said take-up spool, and a flexible connector engageable with said reel and having one end connected with said drive member.

3. The pretensioner of claim 2 wherein said flexible connector is looped loosely around said reel such that initial movement of said one end of said flexible connector tightens a loop of said connector onto said reel and further movement of said drive member rotates said reel in a belt retraction direction.

4. The pretensioner of claim 3 wherein said flexible connector is a wire cable.

5. The pretensioner of claim 1 further including an elongated fuse, said means holding said frangible sheath also holding an end of said fuse and coupling said fuse to adjacent an end of said gas generating means to ignite said gas generating means, said fuse comprising an elongated tube and means for propagating a detonating shock wave along said tube.

6. The pretensioner of claim 1 wherein said pyrotechnic material comprises a plurality of pyrotechnic cords.

7. The pretensioner of claim 6 wherein said pyrotechnic material further comprises pyrotechnic material coated on the inside of said frangible sheath.

8. The pretensioner of claim 7 wherein said pyrotechnic cords and said pyrotechnic material coated on said frangible sheath both include a metal fuel and a particulate oxidizing material.

9. The pretensioner of claim 6 wherein said cords comprise a plurality of elongated strands and material coating said strands.

10. The pretensioner of claim 1 wherein said pressure chamber comprises an elongated tubular member, and wherein said drive member comprises a piston movable longitudinally in said tubular member under the influence of high pressure gas in said pressure chamber.

11. A seat belt pretensioner comprising:
    a pressure chamber;
    said pressure chamber comprising an elongated tubular member;
    a piston movable longitudinally in said tubular member under the influence of high pressure gas in said pressure chamber;
    a gas generating means for generating at least a substantial portion of said high pressure gas consisting of an elongated frangible sheath and a plurality of elongated pyrotechnic cords disposed within said frangible sheath;
    means holding said frangible sheath so that a high pressure gas is released from said frangible sheath on the ignition of said pyrotechnic cord;
    means whereby said high pressure gas is released into said pressure chamber to move said piston;
    means for igniting said gas generating means;
    a reel to tighten a seal belt in response to ignition of said gas generating means; and
    a flexible cable connected with said piston and said reel for rotating said reel in a belt retraction direction upon movement of said piston is said tubular member.

12. A pretensioner for a vehicle seat belt retractor having a rotatable take-up spool on which seat belt webbing is wound, said pretensioner comprising:
    a pressure chamber;
    a drive member movable in said chamber by a high pressure gas;
    means responsive to movement of said drive member for rotating said take-up spool in a belt retraction direction to pull the seat belt webbing against a vehicle occupant and eliminate slack in the seat belt webbing;

a gas generating means for generating said high pressure gas comprising an elongated frangible sheath and at least one elongated gas generating pyrotechnic cord disposed within said sheath;

means holding one end of said frangible sheath so that a portion of said frangible sheath and said pyrotechnic cord extend into said pressure chamber; and means for igniting said pyrotechnic cord.

13. A seat belt pretensioner comprising:

a pressure chamber;

a gas generating means comprising an elongated frangible sheath and a plurality of elongated pyrotechnic cords disposed within said frangible sheath;

means holding one end of said frangible sheath so that a portion of said frangible sheath and said pyrotechnic cords extend into said pressure chamber;

mean for igniting said gas generating means;

a reel to tighten a seat belt in response to ignition of said gas generating means;

said pressure chamber comprising an elongated tubular member;

a piston movable longitudinally in said tubular member under the influence of high pressure gas in said pressure chamber; and a flexible cable connected with said piston and said reel for rotating said reel in a belt retraction direction upon movement of said piton in said tubular member.

* * * * *

UNITED STATES PATENT AND TRADEMARK OFFICE
CERTIFICATE OF CORRECTION

PATENT NO. : 5,145,209
DATED      : September 8, 1992
INVENTOR(S): Reiner Lenzen It is certified that error appears in the above-indentified patent and that said Letters Patent is hereby corrected as shown below:

Column 6, Line 55, Claim 11, change "is" to --in--.

Column 8, Line 14, Claim 13, change "piton" to --piston--.

Signed and Sealed this

Ninth Day of November, 1993

Attest:

BRUCE LEHMAN

Attesting Officer    Commissioner of Patents and Trademarks